(12) United States Patent
Berkan et al.

(10) Patent No.: US 11,000,857 B2
(45) Date of Patent: May 11, 2021

(54) METHOD AND SYSTEM FOR PRECISION SPHEROIDISATION OF GRAPHITE

(71) Applicant: Syrah Resources Ltd., Melbourne (AU)

(72) Inventors: Jens Berkan, Hawthorn East (AU); Joseph Williams, Brighton (AU); Peter Barnes, Cottesloe (AU); Tah Nean Chan, Bullcreek (AU)

(73) Assignee: Syrah Resources Ltd., Melbourne (AU)

( * ) Notice: Subject to any disclaimer, the term of this patent is extended or adjusted under 35 U.S.C. 154(b) by 0 days.

(21) Appl. No.: 16/886,538

(22) Filed: May 28, 2020

(65) Prior Publication Data

US 2020/0346221 A1 Nov. 5, 2020

Related U.S. Application Data

(62) Division of application No. 15/596,948, filed on May 16, 2017, now Pat. No. 10,710,094.

(Continued)

(51) Int. Cl.
*B02C 23/12* (2006.01)
*B02C 23/18* (2006.01)
(Continued)

(52) U.S. Cl.
CPC .......... *B02C 23/12* (2013.01); *B02C 13/1814* (2013.01); *B02C 13/286* (2013.01); *B02C 13/288* (2013.01); *B02C 21/00* (2013.01); *B02C 23/14* (2013.01); *B02C 23/18* (2013.01); *B02C 23/22* (2013.01); *B02C 23/24* (2013.01); *B02C 23/32* (2013.01); *H01M 4/587* (2013.01); *B02C 2013/2869* (2013.01)

(58) Field of Classification Search
CPC ......... B02C 23/12; B02C 23/18; B02C 23/22; B02C 23/32; B02C 23/24; B02C 23/14; B02C 21/00; B02C 13/1814; B02C 13/286; B02C 13/288; H01M 4/587; H01M 10/0525
See application file for complete search history.

(56) References Cited

U.S. PATENT DOCUMENTS 1,542,346 A * 6/1925 Hoover .................. B02C 15/08
241/16
3,978,177 A 8/1976 Huschka et al.
(Continued)

OTHER PUBLICATIONS

Non-Final Office Action for U.S. Appl. No. 15/596,948 dated Nov. 21, 2019, 13 pages.
(Continued)

*Primary Examiner* — Adam J Eiseman
*Assistant Examiner* — Mohammed S. Alawadi
(74) *Attorney, Agent, or Firm* — Kilpatrick Townsend & Stockton LLP

(57) ABSTRACT

A system is disclosed. The system includes an impact processor comprising an inlet and an outlet, a secondary classifier comprising an inlet and an outlet, the secondary classifier being downstream of and coupled to the impact processor, a recirculation mixer valve downstream of and coupled to the outlet of the secondary classifier, and a recirculation line coupling the outlet of the first secondary classifier to the inlet of the impact processor.

8 Claims, 12 Drawing Sheets

Related U.S. Application Data

(60) Provisional application No. 62/338,046, filed on May 18, 2016.

(51) Int. Cl.

| | | |
|---|---|---|
| *B02C 23/22* | (2006.01) | |
| *B02C 23/32* | (2006.01) | |
| *B02C 23/24* | (2006.01) | |
| *B02C 21/00* | (2006.01) | |
| *B02C 23/14* | (2006.01) | |
| *B02C 13/18* | (2006.01) | |
| *B02C 13/286* | (2006.01) | |
| *B02C 13/288* | (2006.01) | |
| *H01M 4/587* | (2010.01) | |
| *H01M 10/0525* | (2010.01) | |

(56) References Cited

U.S. PATENT DOCUMENTS

| | | | |
|---|---|---|---|
| 4,780,112 A * | 10/1988 | Lloyd | C10L 9/02 44/621 |
| 4,989,794 A * | 2/1991 | Askew | A62D 1/0014 241/16 |
| 5,163,562 A * | 11/1992 | Wilhelm | B07B 9/00 209/2 |
| 5,375,776 A * | 12/1994 | Kupper | B02C 23/14 241/19 |
| 5,690,703 A * | 11/1997 | Mitchell | H01M 4/0435 29/623.5 |
| 5,756,062 A | 5/1998 | Greinke et al. | |
| 5,776,244 A * | 7/1998 | Ahrens | B02C 17/16 106/672 |
| 6,325,306 B1 * | 12/2001 | Gacanich | B02C 13/18 241/15 |
| 6,344,296 B1 | 2/2002 | Ishii et al. | |
| 6,403,259 B1 | 6/2002 | Kitagawa et al. | |
| 6,576,369 B1 | 6/2003 | Moriguichi et al. | |
| 6,723,471 B2 | 4/2004 | Kitagawa et al. | |
| 6,764,767 B2 | 7/2004 | Moriguchi et al. | |
| 6,884,545 B2 | 4/2005 | Fukuda et al. | |
| 6,939,526 B2 | 9/2005 | Fukuda et al. | |
| 7,485,395 B2 | 2/2009 | Kim et al. | |
| 7,993,621 B2 | 8/2011 | Zaghib et al. | |
| 8,431,270 B2 | 4/2013 | Matsumoto et al. | |
| 8,753,778 B2 | 6/2014 | Lee et al. | |
| 8,993,170 B2 | 3/2015 | Yue et al. | |
| 9,700,896 B1 * | 7/2017 | Gitschel | C10L 5/40 |
| 9,802,206 B2 * | 10/2017 | Kitaura | B03C 1/30 |
| 2001/0051300 A1 | 12/2001 | Moriguchi et al. | |
| 2003/0152835 A1 | 8/2003 | Dasgupta et al. | |
| 2004/0137328 A1 | 7/2004 | Kim et al. | |
| 2004/0151837 A1 | 8/2004 | Morita et al. | |
| 2004/0227264 A1 | 11/2004 | Zou et al. | |
| 2005/0145729 A1 * | 7/2005 | Stachowski | B02C 21/00 241/27 |
| 2005/0207966 A1 | 9/2005 | Zaghib | |
| 2006/0062716 A1 | 3/2006 | Zaghib et al. | |
| 2006/0133980 A1 | 6/2006 | Nanba et al. | |
| 2007/0194158 A1 | 8/2007 | Zaghib et al. | |
| 2008/0044656 A1 | 2/2008 | Ko et al. | |
| 2009/0032628 A1 * | 2/2009 | Mangelberger | B03C 7/006 241/79.1 |
| 2009/0136849 A1 | 5/2009 | Yue et al. | |
| 2009/0194618 A1 * | 8/2009 | Palin | B01J 20/041 241/29 |
| 2009/0311599 A1 | 12/2009 | Kawai et al. | |
| 2010/0187340 A1 * | 7/2010 | Potter | B02C 21/00 241/18 |
| 2012/0148922 A1 | 6/2012 | Takahashi | |
| 2013/0040203 A1 | 2/2013 | Yoon et al. | |
| 2013/0130117 A1 | 5/2013 | Yamamoto et al. | |
| 2013/0252031 A1 | 9/2013 | Ma et al. | |
| 2013/0309578 A1 | 11/2013 | Umeno et al. | |
| 2014/0045060 A1 | 2/2014 | Park et al. | |
| 2014/0050984 A1 | 2/2014 | Park et al. | |
| 2014/0065488 A1 | 3/2014 | Lee et al. | |
| 2014/0093781 A1 | 4/2014 | Nishihara et al. | |
| 2014/0178762 A1 | 6/2014 | Lee et al. | |
| 2014/0212750 A1 | 7/2014 | Ahn et al. | |
| 2014/0227588 A1 | 8/2014 | Kim et al. | |
| 2014/0356707 A1 | 12/2014 | Kwon et al. | |
| 2015/0308679 A1 * | 10/2015 | Delson | B02C 21/00 110/346 |
| 2016/0280551 A1 * | 9/2016 | Hasegawa | B02C 19/061 |
| 2017/0333913 A1 | 11/2017 | Berkan et al. | |

OTHER PUBLICATIONS

Notice of Allowance for U.S. Appl. No. 15/596,948 dated Apr. 22, 2020, 10 pages.

* cited by examiner

METHOD AND SYSTEM FOR PRECISION SPHEROIDISATION OF GRAPHITE

CROSS-REFERENCES TO RELATED APPLICATIONS

This application is a divisional of U.S. application Ser. No. 15/596,948, filed on May 16, 2017, which is a non-provisional of, and claims the benefit of the filing date of U.S. Provisional Application No. 62/338,046, filed on May 18, 2016, which are herein incorporated by reference in their entirety for all purposes.

SUMMARY

Embodiments of the invention provide for an optimized process for producing graphitic spherules from natural graphite that, as a product powder, are typified by favorable properties, not least including a small standard deviation of particle size distribution, and maximum bulk density. In the following, this product may be referred to as High Density Natural Spherical Graphite, HDNSG. The HDNSG is further characterized by its high density and homogeneity of the individual spherical particles, as well as its surface-anisotropy represented by the dominantly tangential orientation of the outer compressed and particle-embedded graphene layers. These modifications promote the uniformity of the particle's intrinsic lithium ion diffusion properties, as well as enhances low temperature charge and discharge performance, when the particles are present in an anode of a lithium ion battery.

One embodiment of the invention is directed to an impact processor comprising an inlet and an outlet; a secondary classifier comprising an inlet and an outlet, the secondary classifier being downstream of and coupled to the impact processor; a recirculation mixer valve downstream of and coupled to the outlet of the secondary classifier; and a recirculation line coupling the outlet of the first secondary classifier to the inlet of the impact processor.

Another embodiment of the invention is directed to a method for processing particles, the method comprising: introducing a fluid stream comprising particles to an impact processor; milling the graphite particles in the impact processor; passing the milled graphite particles to an inlet of a secondary classifier; separating the milled graphite particles in the secondary classifier into a first graphite particle stream and a second graphite particle stream; passing the second graphite particle stream to a recirculation mixer valve; and recirculating at least some of the graphite particles in the second graphite particle stream to the inlet of the impact processor via a recirculation line.

These and other embodiments of the invention are described in further detail below.

BRIEF DESCRIPTION OF THE DRAWINGS

FIG. 1A shows a sketch of a pure flake of a given size. In FIG. 1B, the flake has been exposed to substantial impacts with the processing equipment and other graphite particles. As a result, the flake starts to bend and partially disintegrate at the edges. In FIG. 1C, processsing has progressed to the degree where more substantial defoliation and dislocation of the flake occurs as well as more substantial bending of these defoliated layers. FIG. 1D shows the final product, the approximately spherical, rounded particle resembling the appearance of a "brussel sprout" that is created towards the end of the process. FIG. 1E shows a "cross-section" through this sprout, with a clearly visible graphite flake core area that remains relatively unaltered by the impact processing forces.

DETAILED DESCRIPTION

Rechargeable battery systems, i.e. based on lithium ion technology, contain an anode and a cathode. In many applications of such or other battery systems, carbon based materials are used for the active material of the anode.

Conventional carbon-based materials are shaped into smaller diameter spherules for technical and physical reasons, and modification is achieved using various processing equipment and techniques. The preferred raw material source for these carbon materials is graphite. Two different versions of graphite are commonly used as starting material. Synthetic graphite, which is derived from refinery or coal baking residues, and natural graphite, which is mined in amorphous, flake or vein form at various sites globally.

Natural graphite occurs predominantly in amorphous carbon and disseminated flakes of different size and shape. The term "flake" describes crystalline graphite comprised of highly ordered layers which ultimately defined the size ratio of the particle. In Cartesian coordinates an idealized three dimensional even particle can be described with by three dimensions: X, Y, Z. A typical flake features a similar length for two sides, X and Y, with a third side, Z, significantly smaller than X, or Y. Other common flake shapes resemble hexagonal structures or even more complex structures. Typical values for Z range from 0.1X to 0.05X.

Natural graphite flake used for processing into spherical graphite is represented in a wide size range, i.e. typically within the −100 Mesh fraction, or <149 µm, but also larger flake fractions are commonly used.

The process described herein resembles a physical-mechanical product transformation from prismatic flake graphite, through crumpled flake, into a characteristically well-rounded ellipsoidal or spherical end product, the HDNSG.

One embodiment of the invention is that transformation occurs gradually, across a multi-step process, whereby the degree of the transformation can be simplified for description as the sum of all milling and shaping impacts each flake has encountered throughout the duration of the entire production process. FIGS. 1A-E illustrates this product transformation process at different stages of progression.

Figures 1A, 1B, 1C, 1D, 1E:
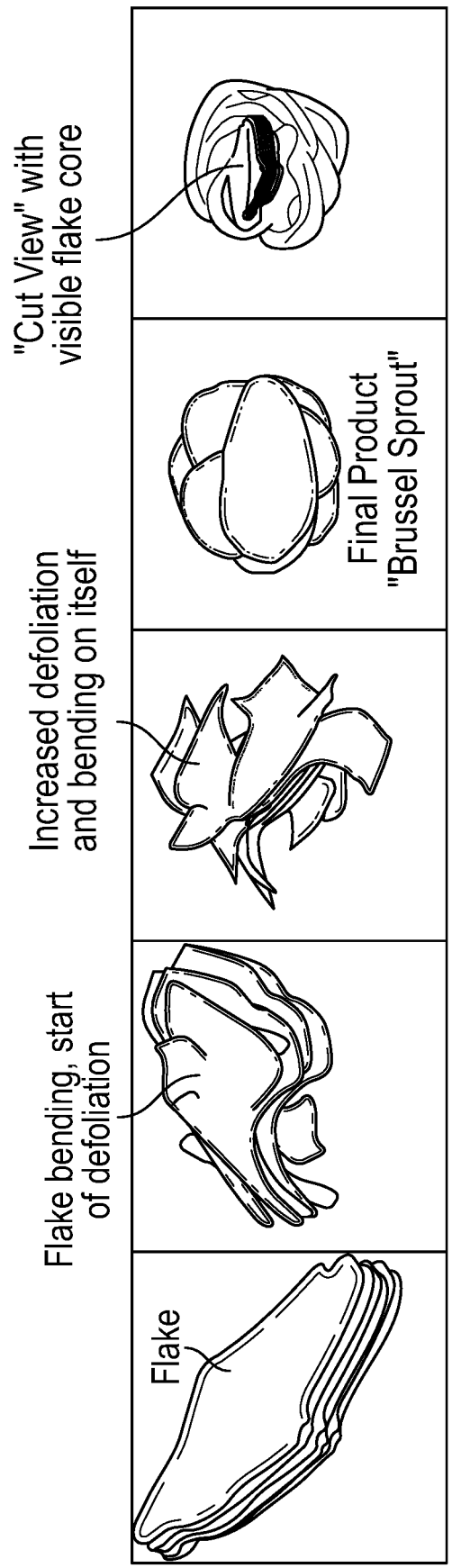
FIGS. 1A-E shows illustrations of a flake re-shaping at different stages of the transformation process.

FIG. 1A shows a sketch of a pure flake of a given size. In FIG. 1B, the flake has been exposed to substantial impacts with the processing equipment and other graphite particles. As a result, the flake starts to bend and partially disintegrate at the edges. In FIG. 1C, this process has progressed to the degree where more substantial defoliation and dislocation of the flake occurs as well as more substantial bending of these defoliated layers. FIG. 1D shows the final product, the approximately spherical, rounded particle resembling the appearance of a "brussel sprout" that is created towards the end of the process. FIG. 1E shows a "cross-section" through this sprout with a clearly visible graphite flake core area that remains relatively unaltered by the impact processing forces.

With refined graphitic properties and functional characteristics, the High Density Natural Spherical Graphite comprises a core surrounded by attached compressed spherically layered surface carbon, where the crystallinity of the core graphite is more crystalline than the surface material, as defined by spectroscopy or diffraction techniques. The variation in crystallinity is caused by the increased extent to which the outer layers have been exposed to mechanical impact and shear force, which induces additional microscopic stress and deformation in this region and exposes additional edge plane defects.

The difference in graphite lattice composition between core and exterior of the HDNSG particle, in some embodiments, does not exceed; 15% expansion in basal carbon aromatic layer ($d_{002}$) spacing, as defined by Electron Microscopy or X-Ray Diffraction where the core spacing is between 3.35 Å and 3.4 Å, or 0.3 in Raman Spectroscopy Intensity Ratios between the Defect (D1355) and Graphite ($G_{1582}$) peaks, $I_D/I_G$, where the graphite core $I_D/I_G$ Intensity Ratio is between 0 and 0.3. The true specific density of the High Density Natural Spherical graphite can be about 2.2 t/m$^3$ or greater, and the averaged ellipticity of individual HDNSG particles is between about 0.7 and 1.0. The HDNSG particle surfaces can be mechanically modified to achieve a microscopic surface roughness of less than about 15% radial radii distance of the related nominal particle radius, $R_N$. The tap density of the product can be between about 0.92 t/m$^3$ and 1.34 t/m$^3$ and the nominal BET surface is greater than about 2.6 m$^2$/g.

The complete product transformation process, inclusive of all transformational equipment, machines or apparatuses, can be defined by the result of the sum of all stochastically relevant impulse transfers onto any graphite particle at any time and location within and throughout the duration of the entire process.

In some embodiments, the process can involve two interlinked steps following each other, with an optional intermediate step in between. The first step of the process utilizes equipment and process parameters that are designed and optimized to modify the input raw material of bulk natural flake graphite into the preferred size or shape fraction of natural graphite particles. The preferred size or shape fraction of the natural graphite particles are used in the second step of the process in terms of particle homogeneity and size distribution that leads to the HDNSG, and simultaneously maximizes yield of production.

As described above, the natural flake graphite process input material typically has a wide particle size distribution, i.e. usually within the −100 Mesh fraction, or <149 µm, but larger flake size fractions may also be used.

For the production of a specific nominal HDNSG fraction, a specific optimal flake input material can be used. As a consequence, a relatively small fraction of the wider, raw flake, material concentrated through mining practice can be directly used and re-shaped into HDNSG. Fractions that are too small, e.g., "fine" particles, can be removed, and fractions of particles that are too large, e.g., "jumbo" particles, preferably undergo size reduction. The optimal input size distribution is therefore collected by a primary means of milling, pulverization and size classification.

Size reduction and classification is one objective of the first process step in the aforementioned interlinked process. This first process step uses milling equipment that simultaneously facilitates the removal of fine particles, and the rapid extraction of optimally sized particles, before they can be further broken down into fines. Here, the jumbo particles are reliably retained to undergo size reduction until the optimal size fraction for extraction is achieved.

One objective of the second process step, in the interlinked process, is re-shaping the optimized flake fraction, derived from the first process step, into HDNSG while minimizing further material loss caused by destructive milling or abrasive effects.

For the conversion of flake into High Density Natural Spherical Graphite (HDNSG), resembling a "brussel sprout" of a particular nominal ideal diameter $D_N$ (i.e. $D_N$=16 µm), a certain nominal volume can be defined through simplifying the particles' complex geometry to a ball-like sphere shape. Hence, as example, the theoretical object volume for $D_N$=16 µm and $D_N$≤32 µm particles are approximately 2,150 µm$^3$ and 6,370 µm$^3$, respectively.

Figure 2:
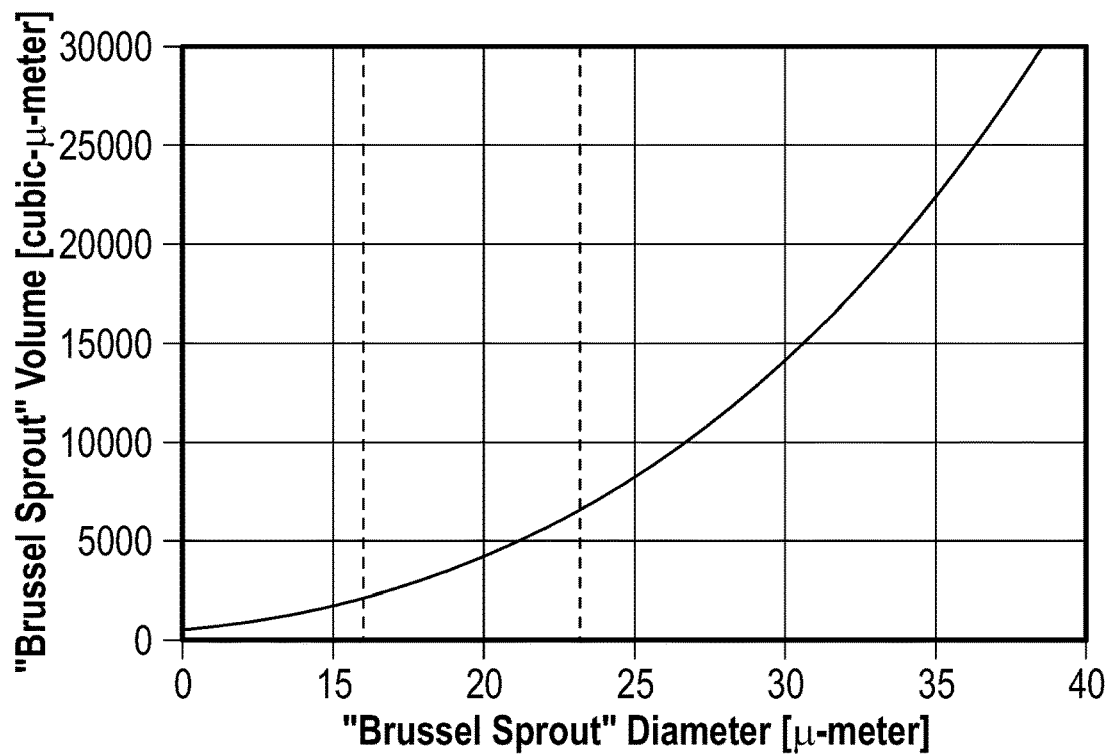
FIG. 2 shows a graph illustrating the ideal volume of "brussel sprouts" HDNSG spherules with different nominal diameters, assuming an ideal sphere or ellipticity of 1.0.

FIG. 2 shows the ideal volume of "brussel sprouts" HDNSG spherules with different nominal diameters, assuming an ideal sphere or ellipticity of 1.0.

Figure 3:
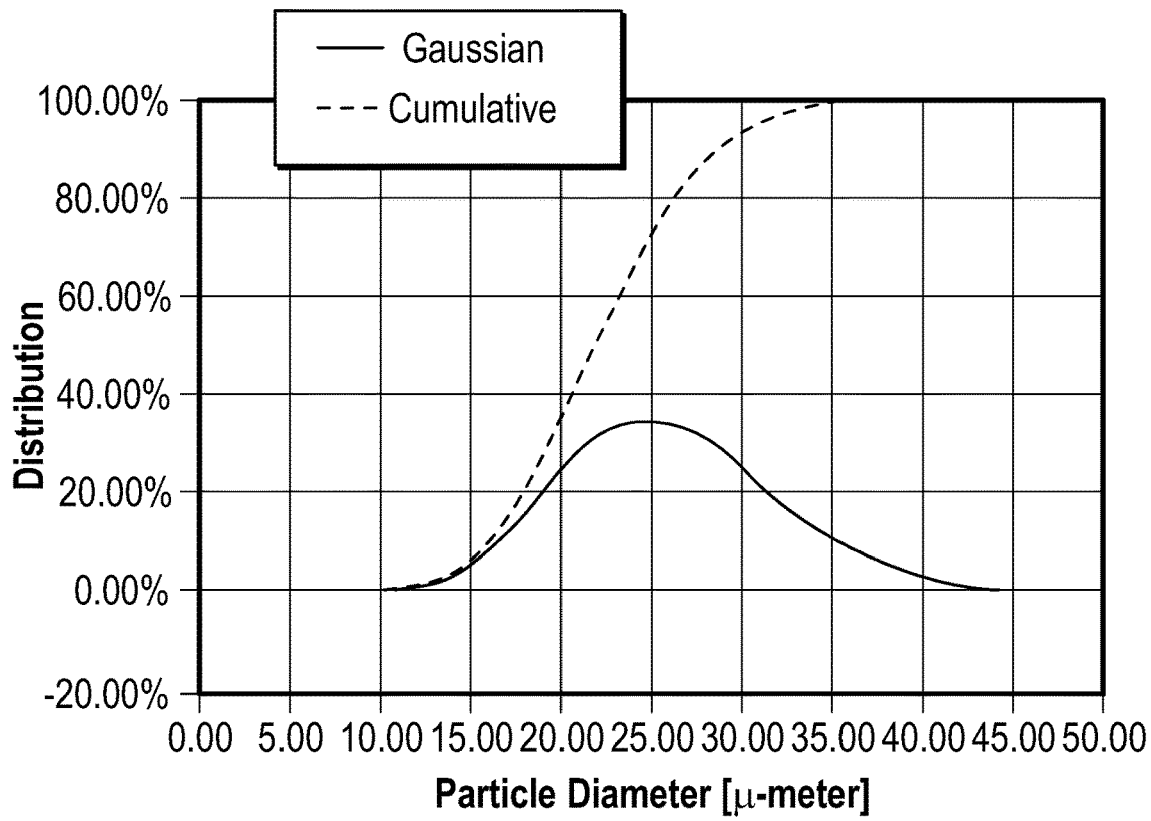
FIG. 3 shows a graph that describes a typical particle size distribution for HDNSG products, with a nominal particle diameter of $D_N$=23 µm.

FIG. 3 shows a typical particle size distribution for HDNSG products, with a nominal particle diameter of $D_N$=23 µm.

Figure 4:
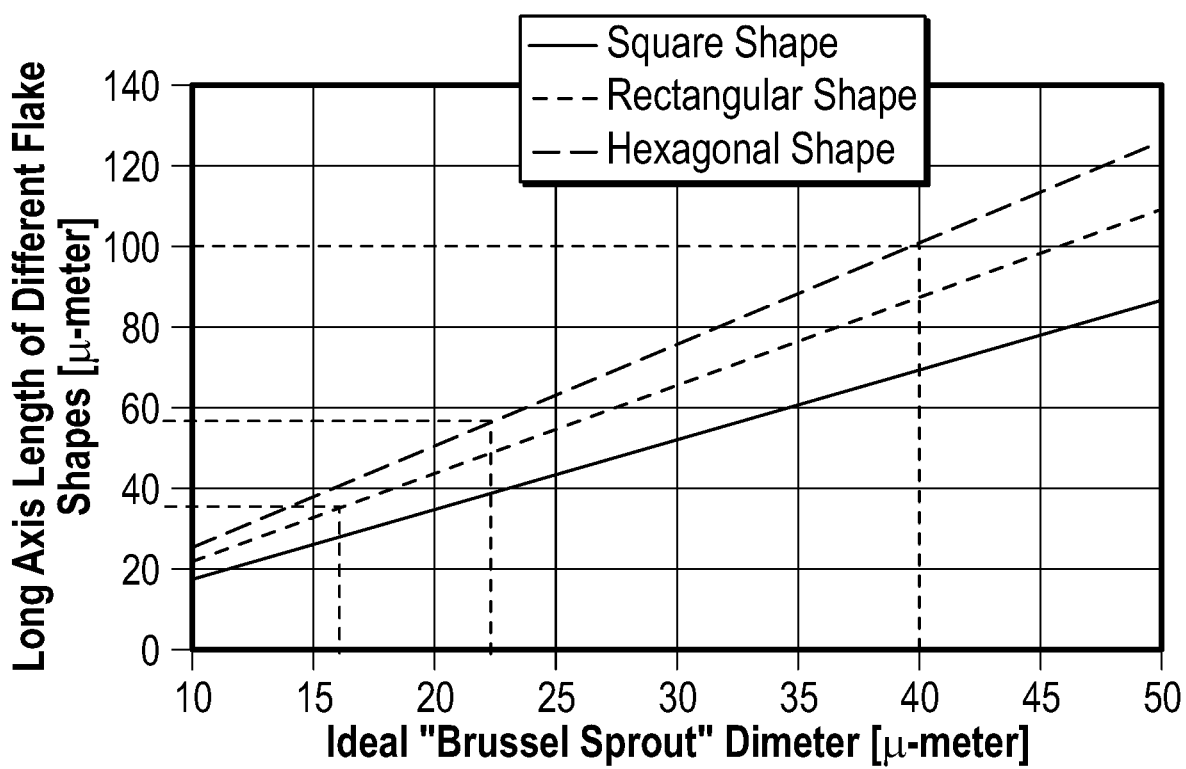
FIG. 4 shows a graph illustrating a range of ideal raw flake input material size distribution as function of product target dimensions, assuming no volumetric loss or gain.

Depending on the nominal characterizing dimensions of the HDNSG product, there is an ideal input flake size which directly correlates to the dimensions of the ideal spherule, assuming there is no volumetric loss or gain during the process. FIG. 4 shows a range of ideal raw flake input material size distribution as function of product target dimensions, assuming no volumetric loss or gain.

FIG. 4 assumes that spherical graphite resembling "brussel sprouts" are produced from prismatic flakes or various forms, square, rectangular and hexagonal, with a nominal thickness, Lc, one fifth of the radius, as previously emphasized based on natural flake graphite dimensions. The particle transformation process, as shown in FIGS. 1A-E, constitutes deformation of prismatic particles into re-shaped well-rounded ellipsoidal particles by folding, overlapping, compression, and smoothening, which in this case assumes no material loss.

Inherently, a variable component of material loss occurs through milling, as graphite particles are re-sized and shaped through physical impact or shear force. For instance, assume that a square particle with a length of 100 µm will pass through 60 µm classification. The particle is cleaved in half twice, and this would create four 50×50 µm particles. In this situation, there is no material loss. However, if the particle is to be broken across an undesirable orientation, within a stoichiometric material flow, a significant portion of byproduct fine particle material will be created.

In embodiments of the invention, to reduce byproduct generation, particles can be cleaved most intensely within the first unit of equipment, the first of the distinctive process steps, briefly classified and retained by means of the internal classifier (if implemented), and then sharply classified within an external classification unit.

Larger particles then can be recirculated rapidly to minimize the degree to which shaping impacts can result in fine waste material.

To a lesser extent, the abrasive smoothening component of processing, especially during the second of the distinctive process steps, also results in a volumetric loss to the original particle.

Stochastically, a small amount of this fine material loss fraction, is reintegrated into the larger particle through compression or simply by being enclosed inside larger defoliated graphite layers. The extent to which this is happening depends on the material properties of the graphite raw material as well as the operative process parameters.

In general, production yields are approximately 40% or greater. Thus, a significant proportion of the graphite is lost during the re-sizing and abrasive phases collectively.

Depending on initial raw material flake size distribution, the material loss to occur during abrasive smoothing events is interpreted to be less than the re-sizing phase. Consequently, the flakes which undergo both re-shaping and smoothing are larger than those described in FIG. 4 to compensate for the material loss. FIG. 4 shows approximately the lower limit to prismatic feed material for the second process step, where bending, folding, defoliation and smoothing occurs.

The typical value for this material loss factor, within the second process step can be between about 0.1-0.3. Classification equipment can thus be calibrated in line with this factor to facilitate the real, inflated, flake size requirements to produce ideal "brussel sprout" spherical graphite.

As a tendency, with increased compaction of the "brussel sprouts" spherical graphite, its volumetric density increases. Therefore, a highly compacted "brussel sprouts" spherical graphite represents a high quality High Density Natural Spherical Graphite (HDNSG). Typically, this high quality, high density spherical product is correlated to larger material losses during processing, as improvements to density and smoothing require an increased duration of impulse and shear exposure.

As FIG. 4 shows, the ideal flake dimensions for the flake to be modified, re-shaped, into the bespoken spherules of a defined diameter, will likely be smaller than the largest flake sizes of the original input (raw flake) material (which can be larger than 150 μm). One purpose of the first part of the production process, therefore, is to expose any of these oversized flakes to a milling event that reduces its physical dimensions to the optimal size.

Typically, the ideal range for flakes to be re-shaped into common HDNSG products is set between about 30 μm-150 μm, subject to actual flake shape, material loss fraction and final HDNSG product diameter specification which typically is in the range of about $D_N$=11 μm–$D_N$=23 μm, or beyond.

The conventionally utilized production equipment for the production of spherical graphite has a number of limitations. Essentially, two types of equipment and process philosophies are evident in current industrial practice. The first type of equipment and process is the usage of separated dedicated equipment for milling, by exposing the raw flake input material to a milling machine, which creates a wide range of milled flake particles of which a small fraction is of the right size distribution, and with a substantial large fraction being too small and a smaller fraction being too large. This mix of processed flake is then transferred into a separate machine or apparatus, called a faculty mill, in which the flake mixture is exposed to a batch processing of spherodisation. Following this batch process, the material is discharged from the faculty mill and subject to a classification treatment. This process produces a poor quality of spherical-like graphite in the suitable size range for the final product. However, the final product has a very low tap density, very inhomogenous particle shapes and a wide distribution of particles, including a large portion of particles that are too fine and is discharged as waste.

Figure 5:
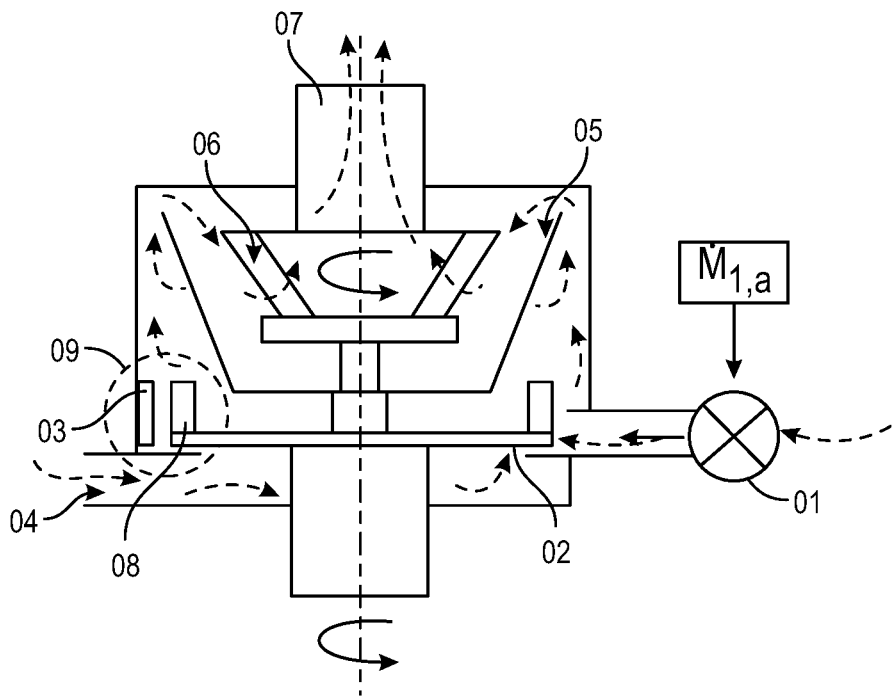
FIG. 5 shows a diagram of an impact classifier processor.

The second type of equipment and process is based on a series of similar sets of equipment and is described as follows. The core of each processing equipment set is a milling systems, commonly an air classifier mill, shown in FIG. 5, which is combined with a classification system. FIG. 5 shows a diagram of an air classifier mill. This mill can be generically referred to as an impact classifier processor, and further generically as an impact processor.

FIG. 5 shows an air classifier mill that includes a particle feeder system 1, which may feed particles to an interior of the housing of the impact classifier processor. The housing may house a rotating impact rotor 2, which may be proximate to stationary impact zone liners 3. A gas inlet 4 may supply a process gas to the interior or the housing. A flow guide 5 may guide the process gas in the interior of the housing. An internalized rotating classification device 7 may be present inside of the flow guide 5, and gas may be exhausted through the exhaust 7. Impactor heads 8 may be attached to the rotating impact rotor 2. The impactor heads 8 and the stationary impact zone liners 3 may form an impact zone 9 where graphite particles are impacted.

Referring to FIG. 5, graphite particles $\dot{M}_{1,a}$, are fed into the particle feeder system 1 from where they are conveyed by means of a pneumatic air jet (or else) into the milling chamber. Within this chamber, the impact rotor 2 transfers kinetic energy onto the particles and accelerates them onto a collision course with the liners 3. During this high impact collision, the flakes are predominantly broken, or "milled." However, especially at lower impact speed and energy, they are shaped into spherules as well.

The process air stream which is flowing into the ACM (air classifier mill) through the gas inlet 4 carries all smaller and lighter particles upstream within the ACM from where they can be extracted by the air stream through the exhaust outlet 7. In many variants, this ACM has an in-built rotating classification device 5 and 6 which internally rejects coarse material.

Figure 6:
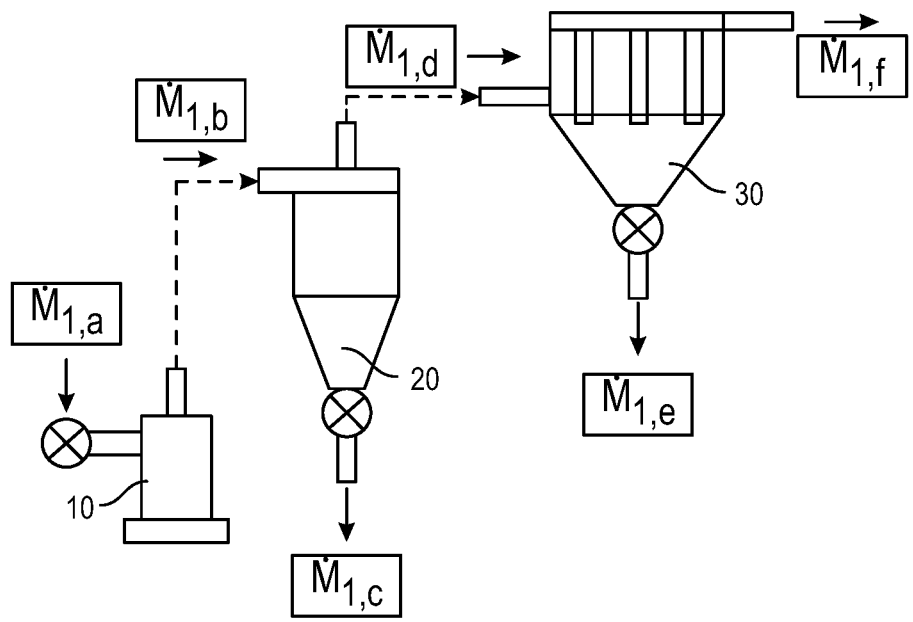
FIG. 6 shows a system including an impact classifier processor, a secondary classifier, and a dust collector.

This ACM can be referred to as a classifier impact processor, and can arranged with further equipment, as shown in FIG. 6. FIG. 6 shows a diagram of a conventional system including a classifier impact processor 10 (type 1), a secondary classifier 20 downstream of the classifier impact processor 10 (e.g., type 1), and a dust collector 30 (e.g. type 1) downstream of both.

The classifier (or classification device) 6 in the classifier impact processor 10, rejects coarse material from the graphite particles $\dot{M}_{1,a}$ fraction, that does not yet satisfy the specific product specifications for this particular set of equipment in terms of size and shape, and mass. This rejected material will stay inside the classifier impact processor 10 until further impact processing has resulted in sufficient particle modification that allows the particles $\dot{M}_{I,b}$ to exit the classifier impact processor via the process gaseous fluid-flow stream. However, due to the strongly irregular shape of the initial graphite particles, this classification function is limited.

These particles $\dot{M}_{1,b}$ are air-conveyed into the secondary classifier 20, where a separation of the intended target material $\dot{M}_{I,c}$, and the unintended fine waste $\dot{M}_{I,e}$ occurs, which at this point is included in the carrier gaseous fluid-flow $\dot{M}_{I,f}$, and is represented by the combined mass flow $\dot{M}_{I,d}$. The unintended fine waste, loss, $\dot{M}_{I,e}$, is separated from the carrier gaseous fluid-flow $\dot{M}_{I,f}$ by means of a separation unit, i.e. a dust collector 30.

Figure 7:
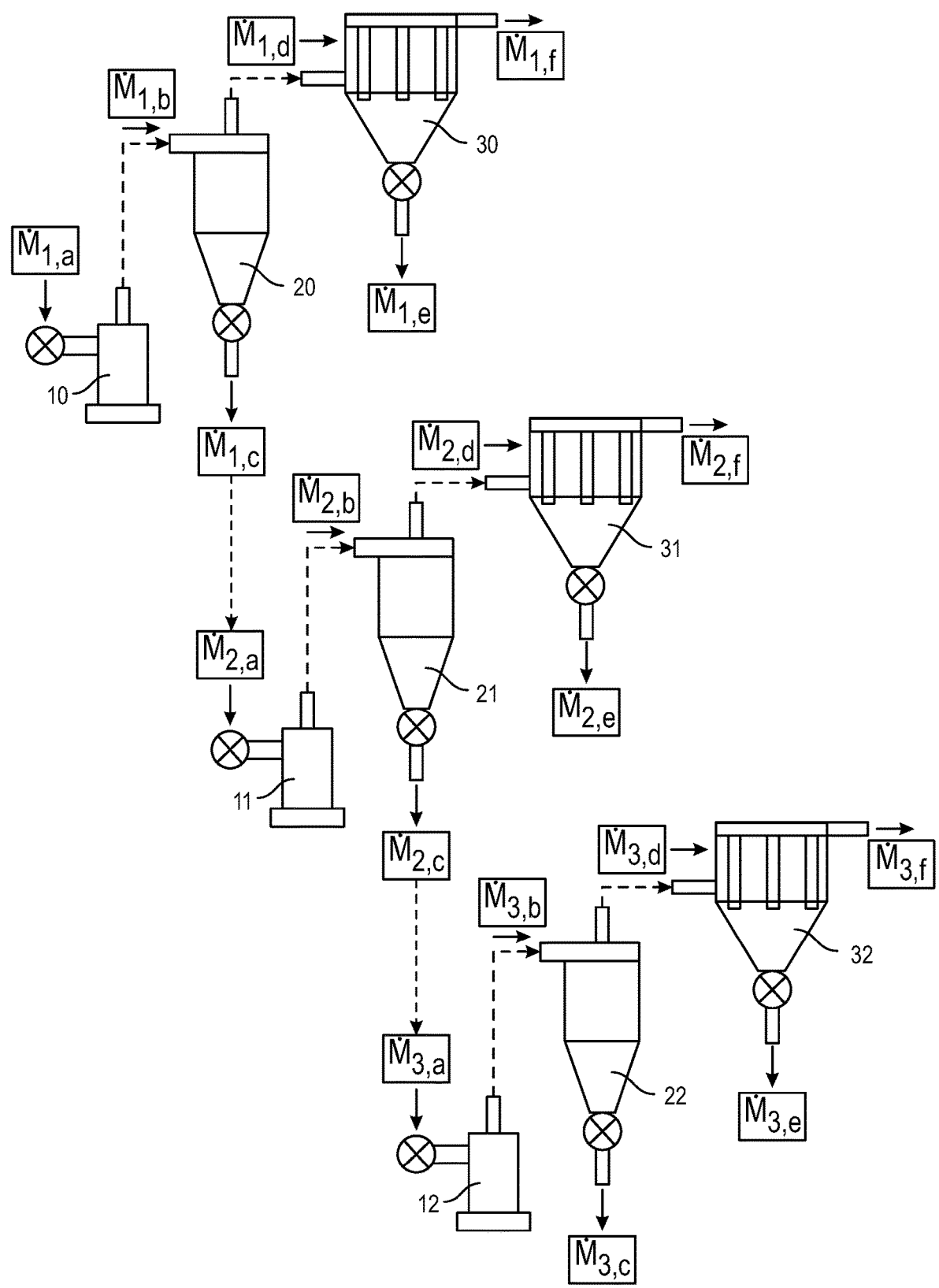
FIG. 7 shows an example for a chain systems of the type shown in FIG. 6.

By repetition of this process utilizing a chain of equipment sets, as shown in FIG. 7, the product can eventually be refined from chain step to chain step, until sufficient combined exposure of the graphite material to the combined number of impacting equipment has occurred and the final product can be discharged.

FIG. 7 shows a diagram of a chain of graphite product transformation equipment. FIG. 7, as an illustrative example, shows only a chain of 3 sets of equipment with:
$\dot{M}_{1,c} = \dot{M}_{2,a}$
$\dot{M}_{2,c} = \dot{M}_{3,a}$
$\dot{M}_{3,c} = \dot{M}_{4,a}$
$\dot{M}_{4,c} = \ldots$
$\ldots < \dot{M}_{4,a} < \dot{M}_{3,a} < \dot{M}_{2,a} < \dot{M}_{1,a}$ However, as stated, the length of the chain can be substantially larger. It is also possible to adjust the size of equipment in between sets, with the later sets in the chain being smaller than the earlier one in order to compensate for the smaller specific mass flow.

A number of improvements to this system can be made that will addressed by embodiments of the invention. First, the illustrated system uses a large number of equipment sets, as up to 17 or more steps, each equal to one set of equipment, within one chain of equipment. Further, due to the fact that during each step some fine waste material is removed, the later sets are operating on a lower load point resulting on higher production cost. Alternatively, the earlier steps can be operated on higher throughput rates, which would result in lower quality and would require compensation by adding more steps, and sets of equipment to the chain of equipment.

As described above, depending on the nominal dimensions of the spherical graphite product that is to be produced from the raw flake graphite input material, there is an ideal flake size directly correlating with the dimensions of the ideal HDNSG particle (e.g., FIG. 4).

Embodiments of the invention can focus on two distinctive aspects of the process, the optimization of the first process step, the milling, and the optimization of the second process step, the shaping.

Figure 8:
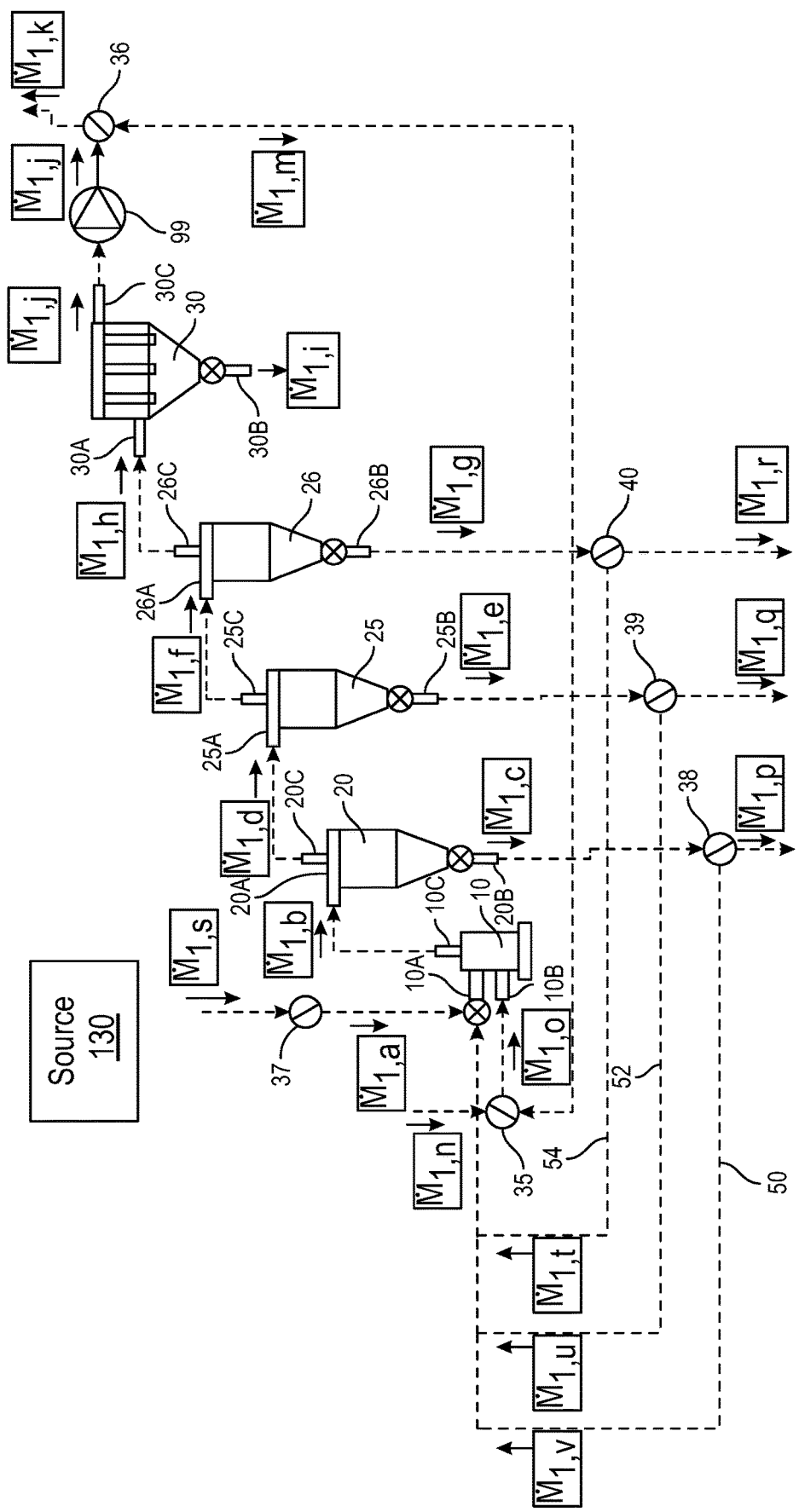
FIG. 8 shows an example of a system that may be a first stage of the multi-stage HDSG production process according to an embodiment of the invention.

A. Optimization of the First Step (Milling):

FIG. 8 shows an example of a system according to an embodiment of the invention. The system shown in FIG. 8 may be characterized as a first stage of the multi-stage HDSG production process.

The optimization of the raw flake input material milling process step can be achieved by adding and introducing a tight and selective multi-classification circuit to the modified milling equipment, including variable partial re-circulation of the ejected, classified graphite particles, as shown in FIG. 8.

FIG. 8 shows an impact processor 10 coupled to and in fluid communication with a first secondary classifier 20, a second secondary classifier 25, a third secondary classifier 26, and a dust collector 30. The dust collector 30 is furthest downstream from the impact processor 10. The impact processor 10 may be a classifier impact processor 10 in some embodiments of the invention. Suitable impact processors may include the type of impact processor shown in FIG. 5. Other types of impact processors may include hammer mills, pin mills, and jet mills.

The impact processor 10 comprises a housing and a first inlet 10A, a second inlet 10B, and an outlet 10C coupled to the housing. The first inlet 10A is for receiving graphite particles from an upstream graphite particle source 130 of graphite particles. The graphite particles from the source 130 may pass through a raw flake input material feeder control 37. The second inlet 10B is for receiving recirculated graphite particles. The outlet 10C is for outputting processed graphite particles.

The first, second, and third classifiers 20, 25, 26 (as well as the other classifiers mentioned in this application) may include any suitable type of apparatus that can separate particles according to size ranges and can shape particles. Exemplary classifiers may include cyclonic air classifiers, inertial classifiers, and screen classifiers.

The first secondary classifier 20 comprises a housing, and a first inlet 20A, a first outlet 20B, and a second outlet 20C coupled to the housing. The first inlet 20A is coupled to the impact processor 10 and is for receiving processed graphite particles from the outlet 10C of the impact processor 10. The first outlet 20B provides a particle stream with particles $\dot{M}_{1,c}$, while the second outlet 20C provides a particle stream with particles $\dot{M}_{1,d}$.

The particle stream with particles $\dot{M}_{1,c}$ passes through a conduit to a first recirculation mixer valve 38. The first recirculation mixer valve 38 can pass a graphite particle product stream with particles $\dot{M}_{1,p}$. The graphite particle product stream with particles $\dot{M}_{1,p}$ can then pass to a first downstream product transformation stage 300 (see FIG. 10). Alternatively or additionally, the first recirculation mixer valve 38 can pass the particle stream with particles $\dot{M}_{1,v}$ back to the inlet 10A of the impact processor 10, via a first recirculation line 50.

The second secondary classifier 25 comprises a housing, and a first inlet 25A, a first outlet 25B, and a second outlet 25C coupled to the housing. The first inlet 25A is coupled to the second outlet 20C of the first secondary classifier 20 and is for receiving processed graphite particles from the second outlet 20C of the first secondary classifier 20. The first outlet 25B provides a particle stream with particles $\dot{M}_{1,e}$, while the second outlet 25C provides a particle stream with particles $\dot{M}_{1,f}$.

The particle stream with particles $\dot{M}_{1,e}$ passes through a conduit to a second recirculation mixer valve 39. The second recirculation mixer valve 39 can pass a graphite particle product stream with particles $\dot{M}_{1,q}$. The graphite particle product stream with particles $\dot{M}_{1,q}$ an then pass to a second downstream product transformation stage 302 (see FIG. 10). Alternatively or additionally, the second recirculation mixer valve 39 can pass processed graphite particles in a particle stream with particles $\dot{M}_{1,u}$ back to the inlet 10A of the impact processor 10, via a second recirculation line 52.

The third secondary classifier 26 comprises a housing, and a first inlet 26A, a first outlet 26B, and a second outlet 26C coupled to the housing. The first inlet 26A is coupled to the second outlet 25C of the second secondary classifier 25 and is for receiving processed graphite particles from the second outlet 25C of the second secondary classifier 25. The first outlet 26B provides a particle stream $\dot{M}_{1,g}$, while the second outlet 20C provides a particle stream $\dot{M}_{1,h}$.

The particle stream with particles $\dot{M}_{1,g}$ passes through a conduit to a third recirculation mixer valve 40. The third recirculation mixer valve 40 can pass a graphite particle product stream with particles $\dot{M}_{1,r}$. The graphite particle product stream with particles $\dot{M}_{1,r}$ can then pass to a third downstream product transformation stage 304 (see FIG. 10). Alternatively or additionally, the third recirculation mixer valve 40 can pass the processed graphite particles $\dot{M}_{1,u}$ in a particle stream back to the inlet 10A of the impact processor 10, via a third recirculation line.

The dust collector 30 may comprise a housing and a first inlet 30A, a first outlet 30B, and a second outlet 30C coupled to the housing. The second outlet of the third secondary classifier 26 can be coupled to and provide the particle stream with $\dot{M}_{1,h}$ to the inlet 30A of the dust collector 30. The first outlet 30B of the dust collector 30 can pass a particle stream with fine dust particles $\dot{M}_{1,i}$ out of the system. The second outlet 30C of the dust collector 30 can pass an air stream $\dot{M}_{1,j}$ to a process air flow blower fan 99. The process air blower fan 99 can pass an air stream $\dot{M}_{1,j}$ to a process air flow intake mixer valve 36. The air stream $\dot{M}_{1,k}$ may exit the system from the process air flow intake mixer valve 36. A recycled process gas stream $\dot{M}_{1,m}$ may pass to a process air flow intake mixer valve 35 and may mix with fresh process gas $\dot{M}_{1,n}$ before entering the impact processor 10 via the second inlet of the impact processor 10.

In embodiments of the invention, the primary raw flake input material, $\dot{M}_{1,a}$, can be natural flake graphite of a wide range of size and distribution. Preferably, $\dot{M}_{1,a}$ can be pre-classified into optimized distribution ranges, i.e. within the range 325 MESH-100 MESH, which is equivalent to flake sizes of approximately 44 μm-150 μm.

$\dot{M}_{1,a}$ may be a fluid stream comprising a gas and graphite particles (e.g., natural graphite flakes) and is fed into the classifier impact processor 10 in a controlled mass flow via the raw flake input material feeder control 37, while mixed with a variable partial recirculation flow of the graphite products $\dot{M}_{1,c}$, $\dot{M}_{1,e}$, $\dot{M}_{1,g}$, which are separated from the main product and process gas flow $\dot{M}_{1,b}$, by the first, second, and third secondary classifiers 20, 25, 26. In some embodiments, the graphite products $\dot{M}_{1,c}$, $\dot{M}_{1,e}$, $\dot{M}_{1,g}$ could be the final products, which may be subsequently subjected to various chemical or physical processing steps, as described in U.S. patent application Ser. No. 15/497,583, filed on Apr. 26, 2017, which is assigned to the same assignee as the present application and is herein incorporated by reference in its entirety for all purposes. In other embodiments, the graphite products $\dot{M}_{1,c}$, $\dot{M}_{1,e}$, $\dot{M}_{1,g}$ could be intermediate products, which could be subjected to further refinement as described in further detail below.

Due to the described limitations of the internal classification device 6 of the classifier impact processor 10, the main product and process gas flow $\dot{M}_{1,b}$ contains a broad range of planar flakes and semi-deformed flakes. In the impact processor 10, any graphite particles or flakes can be milled.

One alternative embodiment of the invention is the opportunity to eliminate the internal classification device 6 from the classifier impact processor 10. However, the internal classification device 6 can also remain in other embodiments. In any case, to satisfy certain process requirement of the process described in embodiments of the invention, the classifier impact processor 10 does not necessarily require the internal classifier, and can also operate as a sole milling impact processor 10, while the classification is entirely externalized and performed by utilizing the secondary classification equipment as described for the method of combined external classification and partial product re-circulation into the milling classifier impact processor 10.

If an internal classification device 6 is used, then the operating parameters of the internal classification device 6, such as carrier gas flow, or classifier wheel rotation speed can be set to minimize product losses by over-milling into ultra-fine graphite particle waste, $\dot{M}_{1,e}$, that would eventually be eliminated from the process by the dust collector 30 and can be disposed of.

The rather wide product particle size distribution curve of the product particles carried within the main product and process gas flow $\dot{M}_{1,b}$, is successively to be classified in the secondary classifier arrangement 20, 25, 26. This secondary classifier arrangement comprises at least one classifier 20. However, it can include multiple classification stages such as three classification stages 20, 25, 26.

In embodiments of the invention, there is no limitation on the number of sequentially arranged secondary classifiers. However, in some cases, not more than three classification devices may be used, which would be sufficient to produce a narrow distribution of classified pre-shaped graphite flake material for further processing into at least three different HDNSG main products of different nominal diameters, ideally utilizing shaping equipment according to the previously described step two production lines.

These secondary classifiers can either be of the cyclone type as illustrated in the FIG. 8, or any other type, i.e. sieve shaker screening machine with a set number of different sieves and outlets. Utilizing screening machines can produce sharper and tighter particle size distributions which may have an advantage for certain HDNSG products to be produced from this screened pre-shaped graphite flake material. This may include the possibility of "skewing" or cutting or multi-modal modification of the particle distribution curves by selectively blending of the classified materials.

Once the screened pre-shaped graphite flake material products are released from the classification devices, the graphite flake material product flows ($\dot{M}_{1,c}$, $\dot{M}_{1,e}$, $\dot{M}_{1,g}$,) can either be used for direct further processing into specific HDNSG, represented in FIG. 8 by the partial graphite flake material product flows $\dot{M}_{1,p}$, $\dot{M}_{1,q}$, $\dot{M}_{1,r}$, or mixed with each other in order to create a specific blend, or partially be re-circulated into the classifier impact processor 10 for a second exposure resulting in re-shaping into smaller diameters. This re-circulate is represented, in FIG. 8, by the partial graphite flake material product re-circulate flows $\dot{M}_{1,v}$, $\dot{M}_{1,u}$, $\dot{M}_{1,t}$. These flows may be present in re-circulation lines 50, 52, 54, between the outlets of the secondary classifiers 20, 25, 26, and the input of the impact processor 10.

Another feature of embodiments of the invention is the capability to re-circulate the main process gas flow $\dot{M}_{1,j}$, whereby $\dot{M}_{1,j}$ is composed of a certain fraction of fresh process gas $\dot{M}_{1,n}$, and a re-circulate, $\dot{M}_{1,n}$. A fraction of $\dot{M}_{1,j}$, which is quasi equivalent to fraction of fresh process gas $\dot{M}_{1,n}$, can be released from the process, $\dot{M}_{1,k}$.

The process can be modified by operating more than one impact processor in parallel, with the number Y of parallel operating impact processors, feeding their graphite particle loaded individual process gas flows $\dot{M}_{I,b}$, into combined secondary classifier arrangements.

Especially if the impact processor of this first stage is operating without an internal classification device, the process can be modified by operating more than one impact processor in series. The number Z can be the number of serial operating impact processors, with the last one feeding their graphite particle loaded individual process gas flows $\dot{M}_{1,b}$, into combined secondary classifier arrangements.

Figure 9:
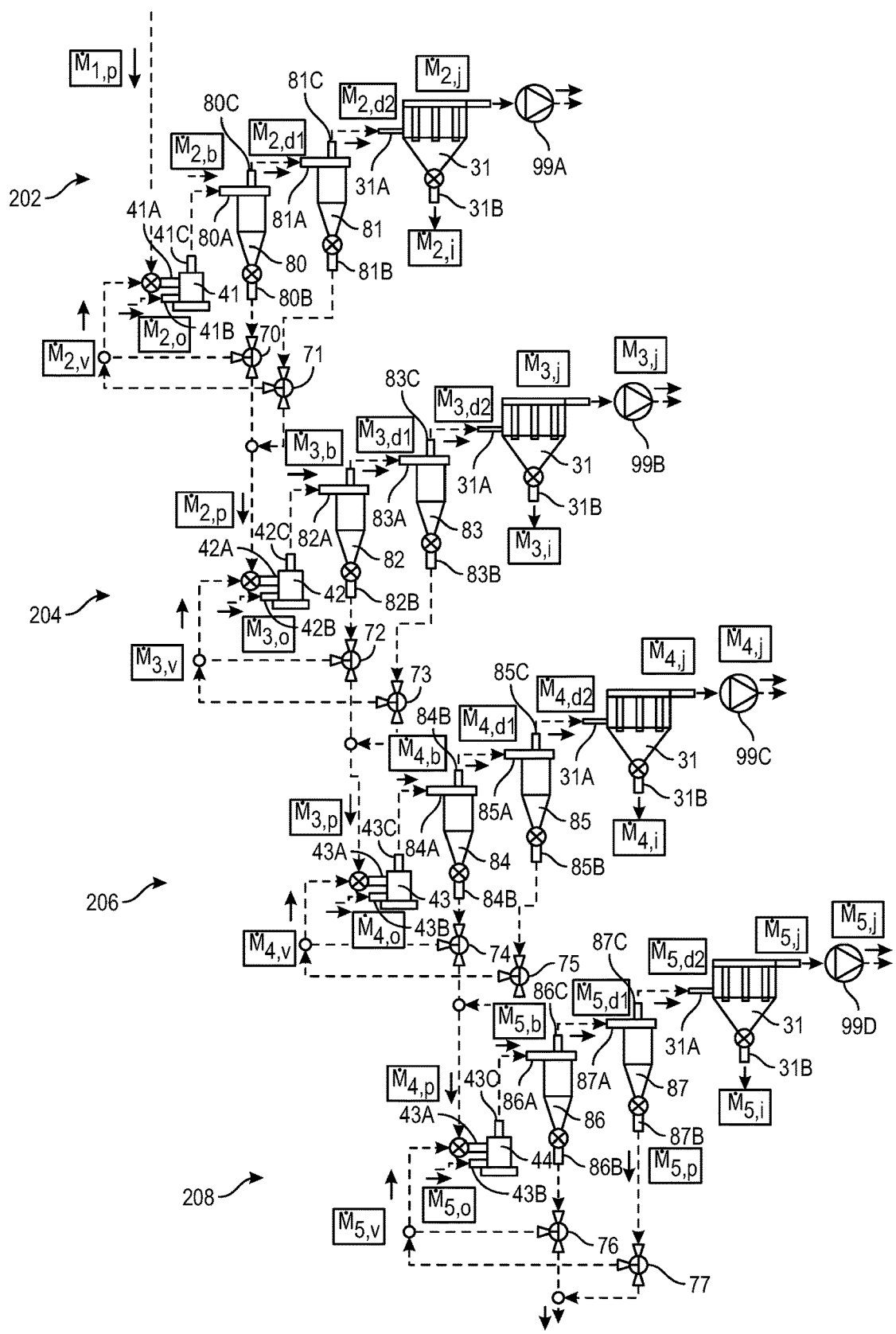
FIG. 9 shows a second stage including downstream processing equipment for the production of high quality high density natural spherical graphite based on classified pre-shaped graphite flake particles.

The classified pre-shaped graphite flake particles, i.e. $\dot{M}_{1,p}$, $\dot{M}_{1,q}$, $\dot{M}_{1,r}$, depending on the number of deployed secondary classification devices, is then transferred into the downstream processing equipment, as described hereafter, with the downstream processing equipment being optimized for the final shaping (spheroidisation) of the supplied classified flake fractions (FIG. 9).

B. Optimization of the Second Step (Re-Shaping):

The optimal natural flake graphite intended for the anode material for a lithium ion battery comprises regular, evenly sized, and densely compressed spherical-like graphite particles; a narrow particle size distribution; minimized irregularities in individual particle shape shown as deviation from the ideal spherule shape; and maximized volumetric density within individual spherules. However, natural prismatic flake graphite comprises stacked sheets of small crystallized graphene layers, which resemble thin flat plates of graphite material. In order to transform these flakes into spherical graphite, as in embodiments of the invention, mechanical processing by means of well-defined impulse transfer is desired. This can be achieved by a re-shaping process, as shown in the system illustrated in the diagram in FIG. 9. The re-shaping process can be optimized for the production of spherical graphite. Ultimately, the spherules resemble the geometry and textures of "brussel sprouts" with a core of flake graphite, evenly clasped by compressed flake laminae and graphite layers tightly compressed, with minimal cavities and void space. This process leads to a High Density Natural Spherical Graphite product: "HDNSG".

The graphite particle product transformation from the flake to the end product, the HDNSG, occurs gradually, across a multi-step re-shaping process, whereby the degree of the shape transformation can be described as the sum of all shaping impacts each flake has encountered throughout the duration of the entire product transformation process.

The shaping itself can be influenced by the geometrical equipment (and throughput) and parameters such as the product transformation chamber, the enclosed applied product shaping head geometry, physical gaps between shaping head fingers, or outer geometry of the transformation chamber, the available physical spaces for the graphite material to flow within and re-arrange, the transformation chamber filling level with graphite (the specific load), operating speeds of the impactor heads within the transformation chamber, gaseous fluid flow through the equipment (carrier flow), additional ballast loading (with inert material or fine off-shavings, production waste material), and the amount of product re-circulation that happens throughout the product transformation process, etc.

FIG. 9 shows exemplarily four sets of connected equipment in series. The four sets of connected equipment can form a downstream product transformation stage. The classification equipment in a set of equipment may include an impact processor, one or more secondary classifiers, and one or more three way valves. Each equipment set may be configured to process a certain size range of particles. The equipment sets may be denoted by different types, which can respectively process different particle size ranges. For example, the different types of equipment sets may be denoted by type 1, type 2, type 3, type 4, type 5, etc. which a higher number type processes particles within a smaller size range. The sizes of the particles of each of the particle streams in FIG. 9 and other figures in this application may be denoted as follows:

... $<\dot{M}_{5,p}<\dot{M}_{4,p}<\dot{M}_{3,p}<\dot{M}_{2,p}<\dot{M}_{1,p}$ ...

Specifically, FIG. 9 shows a first equipment set 202 comprising a type 2 (downstream) impact processor 41, a type 2 first secondary classifier 80, a second type 2 secondary classifier 81, and a dust collector 31.

The type 2 impact processor 41 comprises a housing and a first inlet 41A, a second inlet 41B, and an outlet 41C coupled to the housing. The first inlet 41A is for receiving graphite particles in particle stream $\dot{M}_{1,p}$ from FIG. 8. The second inlet 41B is for receiving recirculated process gas from a process air flow intake mixer valve (not shown) downstream of the process air blower fan 99. The outlet 41C is for outputting processed graphite particles in a stream $\dot{M}_{2,b}$.

The type 2 first secondary classifier 80 comprises a housing, and a first inlet 80A, a first outlet 80B, and a second outlet 80C coupled to the housing. The first inlet 80A is coupled to the impact processor 41 and is for receiving processed graphite particles from the outlet 41C of the impact processor 41. The first outlet 80B provides a particle stream that passes through a type 1 first three way valve 70, and eventually merges into particle stream $\dot{M}_{2,\nu}$, while the second outlet 80C provides a particle stream $\dot{M}_{2,d1}$.

The type 2 second secondary classifier 81 comprises a housing, and a first inlet 81A, a first outlet 81B, and a second outlet 81C coupled to the housing. The first inlet 81A is coupled to the type 2 first secondary classifier 80 and is for receiving processed graphite particles from the second outlet 80C of the type 2 first secondary classifier 80. The first outlet 81B provides a particle stream that passes through a type 1 second three way valve 71, and eventually merges into particle stream $\dot{M}_{2,\nu}$, while the second outlet 81C provides a particle stream $\dot{M}_{2,d2}$.

The dust collector 31 may comprise a housing and a first inlet 31A, a first outlet 31B, and a second outlet 31C coupled to the housing. The second outlet 81C of the type 2 second secondary classifier 81 can be coupled to and provide the particle stream with particles $\dot{M}_{2,d2}$ to the inlet 31A of the dust collector 31. The first outlet 31B of the dust collector 30 can pass a particle stream with particles $\dot{M}_{2,i}$ out of the system. The second outlet 31C of the dust collector 30 can pass a particle stream with particles $\dot{M}_{2,j}$ to a process air flow blower fan 99. The process air blower fan 99A can pass a particle stream with particles $\dot{M}_{2,j}$ to a process air flow intake mixer valve (not shown), and then may mix with fresh process gas before entering the impact processor 41 via the second inlet 41B of the impact processor 41 as stream with particles $\dot{M}_{2,o}$.

FIG. 9 also shows a second equipment set 204 comprising a type 3 (downstream) impact processor 42, a type 3 first secondary classifier 82, a type 3 second secondary classifier 83, and a dust collector 31.

The type 3 impact processor 42 comprises a housing and a first inlet 42A, a second inlet 42B, and an outlet 42C coupled to the housing. The first inlet 42A is for receiving graphite particles in particle stream with particles $\dot{M}_{2,p}$ from the first outlet 80B of the type 2 first secondary classifier 80. The second inlet 42B is for receiving recirculated process gas in stream $\dot{M}_{3,o}$ from a process air flow intake mixer valve (not shown) downstream of the process air blower fan 99B. The outlet 42C is for outputting processed graphite particles in a stream with particles $\dot{M}_{3,b}$.

The type 3 first secondary classifier 82 comprises a housing, and a first inlet 82A, a first outlet 82B, and a second outlet 82C coupled to the housing. The first inlet 82A is coupled to the impact processor 42 and is for receiving processed graphite particles from the outlet 42C of the impact processor 42. The first outlet 82B provides a particle stream that passes through a type 2 first three way valve 72, and eventually merges into particle stream with particles $\dot{M}_{3,\nu}$, while the second outlet 82C provides a particle stream with particles $\dot{M}_{3,d1}$.

The type 3 second secondary classifier 83 comprises a housing, and a first inlet 83A, a first outlet 83B, and a second outlet 83C coupled to the housing. The first inlet 83A is coupled to the type 3 first secondary classifier 82 and is for receiving processed graphite particles from the second outlet 82C of the type 3 first secondary classifier 82. The first outlet 83B provides a particle stream that passes through a type 2 second three way valve 72, and eventually merges into particle stream with particles $\dot{M}_{3,v}$, while the second outlet 83C provides a particle stream with particles $\dot{M}_{3,d2}$.

The dust collector 31 may comprise a housing and a first inlet 31A, a first outlet 31B, and a second outlet 31C coupled to the housing. The second outlet 83C of the type 3 second secondary classifier 83 can be coupled to and provide the particle stream with particles $\dot{M}_{3,d2}$ to the inlet 31A of the dust collector 31. The first outlet 31B of the dust collector 30 can pass a particle stream with fine particles (e.g., dust) $\dot{M}_{3,i}$ out of the system. The second outlet 31C of the dust collector 30 can pass an air stream $\dot{M}_{3,j}$ to a process air flow blower fan 99. The process air blower fan 99B can pass the air stream $\dot{M}_{3,j}$ to a process air flow intake mixer valve (not shown), and then may mix with fresh process gas before entering the impact processor 41 via the second inlet 41B of the impact processor 41 as stream $\dot{M}_{3,o}$.

FIG. 9 also shows a third equipment set 206 comprising a type 4 (downstream) impact processor 43, a type 4 first secondary classifier 84, a type 4 second secondary classifier 85, and a dust collector 31.

The type 4 impact processor 43 comprises a housing and a first inlet 43A, a second inlet 43B, and an outlet 43C coupled to the housing. The first inlet 43A is for receiving graphite particles in particle stream $\dot{M}_{3,p}$ from the first outlet 82B of the type 3 first secondary classifier 82. The second inlet 42B is for receiving recirculated process gas in stream $\dot{M}_{4,o}$ from a process air flow intake mixer valve (not shown) downstream of the process air blower fan 99C. The outlet 43C is for outputting processed graphite particles in a stream $\dot{M}_{4,b}$.

The type 4 first secondary classifier 84 comprises a housing, and a first inlet 84A, a first outlet 84B, and a second outlet 84C coupled to the housing. The first inlet 84A is coupled to the impact processor 43 and is for receiving processed graphite particles from the outlet 43C of the impact processor 43. The first outlet 84B provides a particle stream that passes through a type 3 first three way valve 74, and eventually merges into particle stream with particles $\dot{M}_{4,v}$, while the second outlet 82C provides a particle stream with particles $\dot{M}_{4,d1}$.

The type 4 second secondary classifier 85 comprises a housing, and a first inlet 85A, a first outlet 85B, and a second outlet 85C coupled to the housing. The first inlet 85A is coupled to the type 4 first secondary classifier 84 and is for receiving processed graphite particles from the second outlet 84C of the type 4 first secondary classifier 84. The first outlet 85B provides a particle stream that passes through a type 3 second three way valve 74, and eventually merges into particle stream with particles $\dot{M}_{4,v}$, while the second outlet 85C provides a particle stream with particles $\dot{M}_{4,d2}$.

The dust collector 31 may comprise a housing and a first inlet 31A, a first outlet 31B, and a second outlet 31C coupled to the housing. The second outlet 85C of the type 4 second secondary classifier 85 can be coupled to and provide the particle stream with particles $\dot{M}_{4,d2}$ to the inlet 31A of the dust collector 31. The first outlet 31B of the dust collector 30 can pass a particle stream $\dot{M}_{4,i}$ out of the system. The second outlet 31C of the dust collector 30 can pass an air stream $\dot{M}_{4,j}$ to a process air flow blower fan 99C. The process air blower fan 99C can pass an air stream $\dot{M}_{4,j}$ to a process air flow intake mixer valve (not shown), and then may mix with fresh process gas before entering the impact processor 43 via the second inlet 43B of the impact processor 43 as stream $\dot{M}_{4,o}$.

FIG. 9 also shows a fourth equipment set 208 comprising a type 5 (downstream) impact processor 44, a type 3 first secondary classifier 86, a second type 2 secondary classifier 87, and a dust collector 31.

The type 5 impact processor 44 comprises a housing and a first inlet 44A, a second inlet 44B, and an outlet 44C coupled to the housing. The first inlet 44A is for receiving graphite particles in particle stream $\dot{M}_{4,p}$ from the first outlet 86B of the type 4 first secondary classifier 84. The second inlet 44B is for receiving recirculated process gas in stream $\dot{M}_{5,o}$ from a process air flow intake mixer valve (not shown) downstream of the process air blower fan 99D. The outlet 44C is for outputting processed graphite particles in a stream $\dot{M}_{5,b}$.

The type 5 first secondary classifier 86 comprises a housing, and a first inlet 86A, a first outlet 86B, and a second outlet 86C coupled to the housing. The first inlet 86A is coupled to the impact processor 44 and is for receiving processed graphite particles from the outlet 44C of the impact processor 44. The first outlet 86B provides a particle stream that passes through a type 4 first three way valve 76, and eventually merges into particle stream with particles $\dot{M}_{5,v}$, while the second outlet 84C provides a particle stream with particles $\dot{M}_{5,d1}$.

The type 5 second secondary classifier 87 comprises a housing, and a first inlet 87A, a first outlet 87B, and a second outlet 87C coupled to the housing. The first inlet 87A is coupled to the type 5 first secondary classifier 86 and is for receiving processed graphite particles from the second outlet 86C of the type 5 first secondary classifier 86. The first outlet 86B provides a particle stream that passes through a type 5 second three way valve 77, and eventually merges into particle stream with particles $\dot{M}_{5,v}$, while the second outlet 87C provides a particle stream with particles $\dot{M}_{5,d2}$.

The dust collector 31 may comprise a housing and a first inlet 31A, a first outlet 31B, and a second outlet 31C coupled to the housing. The second outlet 87C of the type 5 second secondary classifier 87 can be coupled to and provide the particle stream with particles $\dot{M}_{5,d2}$ to the inlet 31A of the dust collector 31. The first outlet 31B of the dust collector 30 can pass a particle stream with fine particles (e.g., dust) $\dot{M}_{5,j}$ out of the system. The second outlet 31C of the dust collector 30 can pass an air stream $\dot{M}_{5,j}$ to a process air flow blower fan 99C. The process air blower fan 99C can pass the air stream $\dot{M}_{5,j}$ to a process air flow intake mixer valve (not shown), and then may mix with fresh process gas before entering the impact processor 43 via the second inlet 43B of the impact processor 43 as stream $\dot{M}_{5,o}$.

Embodiments of the invention can optimize the product transformation process that, in both stage-individually and in total (e.g., all stages in series), the amount of the graphite material loss ($\Sigma \dot{M}_{I,i}$) due to secondary effects is minimized, as input material is transferred into HDNSG of pre-defined particle shape and size distribution.

Generally, the larger the size of the initial flake input material in relation to the size of the final HDNSG product particle size, the smaller the final HDNSG particle size, and the tighter the target HDSG product particle size distribution, the more physical impact manipulation to the graphite particle. Thus, exposure of the graphite particles to the classifier impact processors is needed, and is characterized as accumulated impact processing time or exposure.

This can be achieved in at least two ways. First, the number I of stages that are interconnected in series can be increased, and second, the amount of stage-internal graphite particle material re-circulation $\dot{M}_{I,v}$, can be increased. Typically, the number I of in series interconnected stages can be between about 3 and about 25. In one embodiment this innovative line of product transformation equipment includes a total number of stages I=4, in another I=6, and further I<10.

Due to the gradational variation in graphite particle mass throughput (graphite load point) from previous stage to following stage (in primary graphite particle mass intake, graphite particle mass re-circulation, particle sizes and shapes), each stage operates on stage-specific parameters regarding gaseous fluid mass-flow, graphite particle mass-flows, impactor and classifier speeds. It is also possible to use impactors and classifiers with different chamber volumes and geometries.

The sizing and shaping effects on the graphite particle can be described as the result of the sum (vector addition) of all energy (impulse |vector|) transfer a particle encounters over the course of its progression throughout the entire processing stream of stages.

With an increasing amount of accumulated mechanical impulse energy transfer, equivalent to an increased number of encountered impulse transfers, the geometrical modification of the graphite particle progresses toward an ideal shape and density for the HDNSG. Beyond a critical threshold of energy transferred, the particle may encounter destruction due to breaking or abrasive shaving of the surface.

For stationary or quasi-stationary operating conditions, such as a given graphite particle mass-flow through any impact processor of any stage in the series of stages of processing equipment, the average impact processing time for the individual particle is defined by the individual particle size in relation to the internal classifier classification parameter settings, as well as the proportion of material recirculation, etc.

Statistically, for a given particle size distribution of a stage specific input material $\dot{M}_{I,p}$, the likelihood to be carried out of the classifier impact processor within the mass flow $\dot{M}_{I,b}$, is increased with reduced mass or diameter for symmetric spherical like particles as well as for larger and geometrically highly asymmetrical flake particles, and for the fine waste material that is created during the impact process.

These particles are carried out of the impact processor by the particle and carrier gas flow $\dot{M}_{I,b}$, and fed through the secondary classification devices (e.g., 80, 81). The first of the secondary classification devices (e.g., 80) can be designed and calibrated to remove larger and geometrically highly asymmetrical flake particles, which, by means of the three way valve (i.e. 70) can be introduced into the re-circulation mass flow $\dot{M}_{I,v}$, and can be returned into the impact processor for a further round of impact processing.

The second of the secondary classification devices (e.g., 81) is accepting the overflow of the first classifier and is designed and calibrated to remove the more processed symmetric spherical like particles, which, via forwarding mass flow $\dot{M}_{I,p}$, are either removed from the stage and transferred to a further downstream processing stage, or likewise can be, in any proportion, re-circulated into the impact processor, by means of the three way valve (e.g., 71). The dust collector (e.g., bag filter) 31 will remove the fine waste still carried within the carrier gas flow.

The calibration settings of the separation defining parameters of the impact processor internal classifier in relation to the first and second secondary classification devices can determine the internal throughput of graphite particles through the stage.

The total net throughput through the entire stage can be defined by the stage-internal re-circulation of graphite particles that have been separated in the first and/or second classifier of the secondary classification devices as well as the production yield of the stage (loss of fine waste material).

A faster throughput (increased graphite mass-net-flow) of graphite material through a stage, as well as a reduced re-circulation of graphite material within a stage, reduces the average individual graphite particle exposure time per stage. This results in higher production rate. However, it likewise produces a diminishing number of transferred impulses along the series and a lower cumulative energy transfer per particle within each individual stage.

An increased and faster material throughput will also lead to a reduction in effective shape transformation from flake toward HDNSG within the particular stage. In order to compensate for the reduction in stage-specific impulse energy transfer, the total number of stages, which the graphite material must pass through, can be increased accordingly, and vice-versa.

With each progressing downstream stage number, each stage proceeds from initial shaping towards final precision formation and shaping, and volumetric compaction of the HDNSG into the characteristic shapes resembling "brussel sprouts." Thus, impact processor internal agitation settings and design parameters such as rotating speeds, and impactor geometry are adjusted accordingly. Impact speed is reduced and impactor geometry is "rounded".

The stages, including the impactor processors and classification devices, can be calibrated and operated to ensure that graphite particles are rolled repeatedly into "brussel sprouts," where all edges of the spherical graphite particle are compressed back into the spherical graphite particle form, covered in basal layers, and smoothened by gentle abrasion.

Minor size reduction due to fractional milling takes place predominantly because of the abrasion related to the relative movement of particles against each other and the impactor equipment during the formation process.

Figure 10:
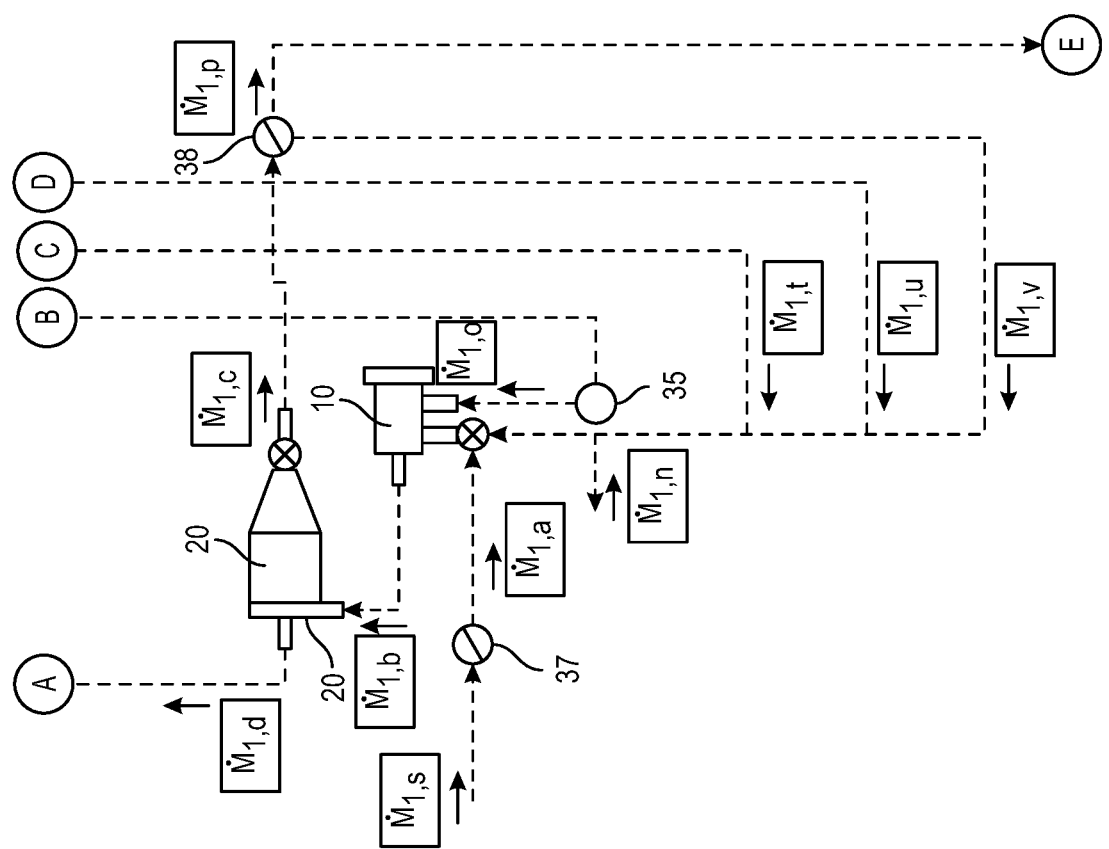
FIG. 10 shows a combined first and second stages of the HDNSG manufacturing process.
Figure 10:
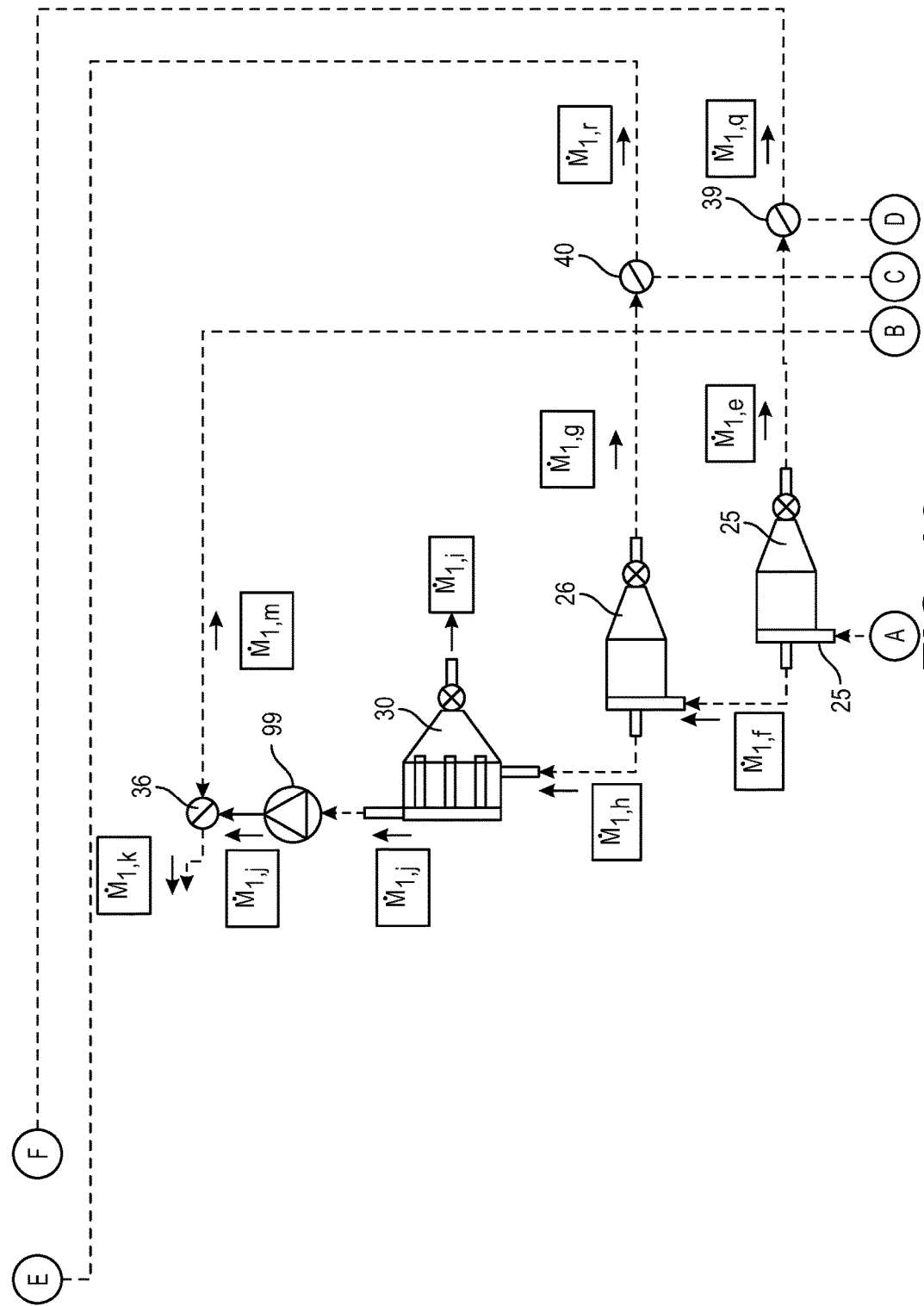
Figure 10:
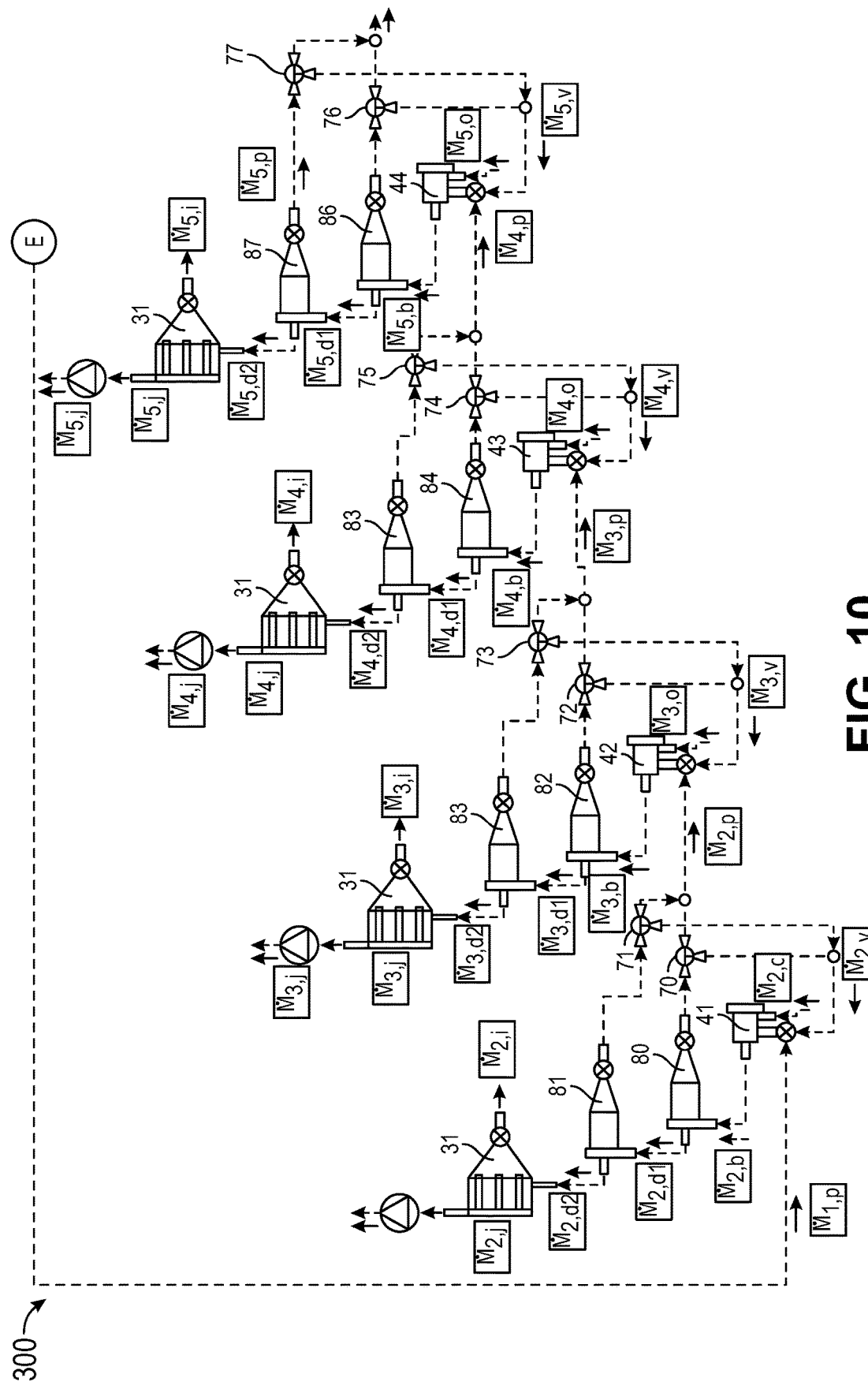
Figure 10:
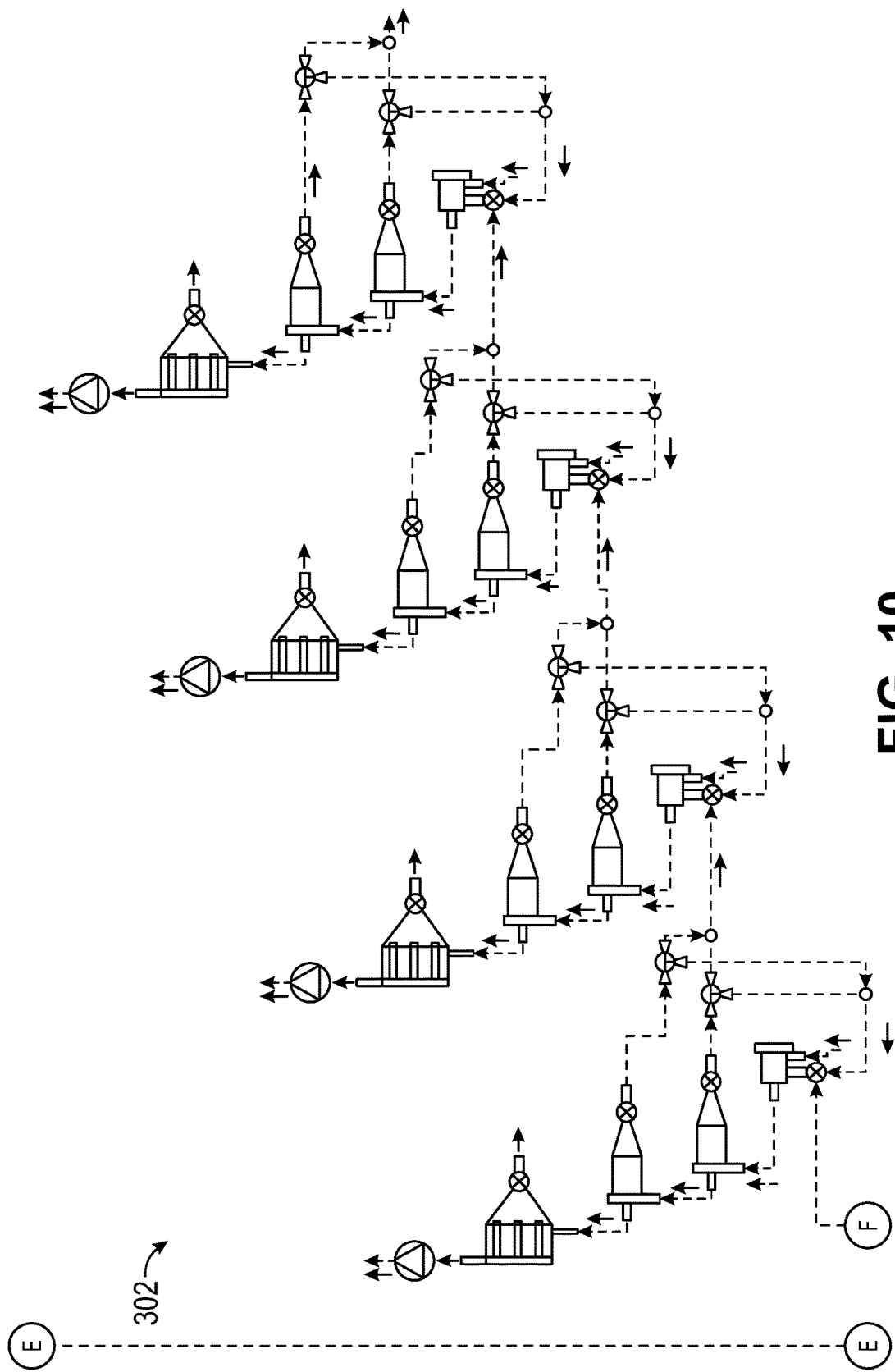
Figure 10:
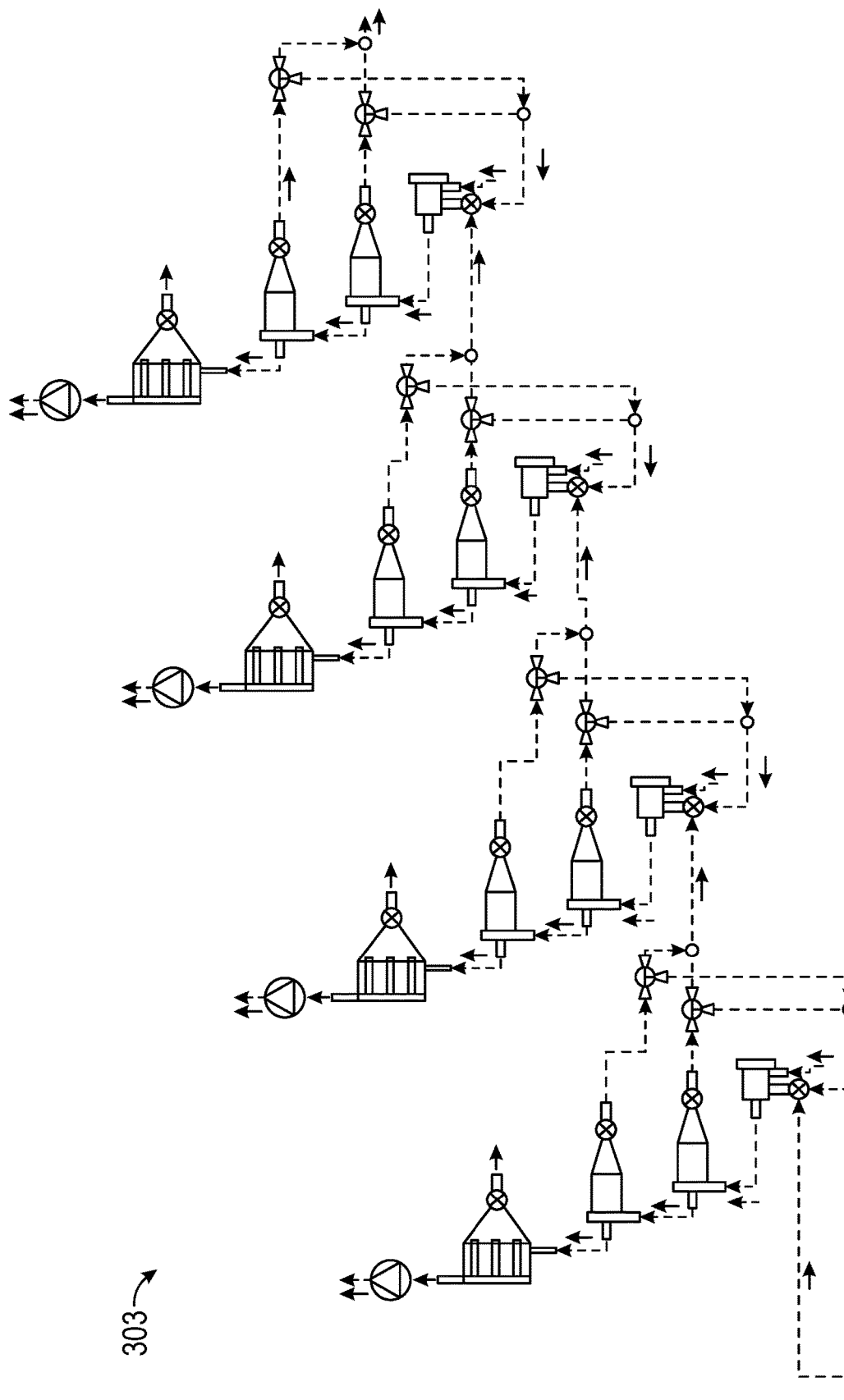

FIG. 10 shows a diagram of combined first and second stages of the HDNSG manufacturing process. More specifically, FIG. 10 shows exemplarily the combination of the first and second stages, as shown in FIG. 8 and FIG. 9, comprising a first pulverization and classification stage with three selective product outlets ($\dot{M}_{1,p}$, $\dot{M}_{1,q}$, $\dot{M}_{1,r}$) that feed into ($\dot{M}_{2,p}$, $\dot{M}_{3,p}$, $\dot{M}_{4,p}$) the downstream second stage processing equipment for the production of high quality High Density Natural Spherical Graphite. In FIG. 10, the downstream equipment is exemplarily illustrated as a stage-internally recirculating process comprising a total of 4 internal stages. This number can vary with product requirements.

Each of 300, 302, 303 may receive graphite particles from the first, second and third secondary classifiers 20, 25, 26, and may be characterized as first, second, and third downstream product transformation stages. Each of the first, second, and third downstream product transformation stages 300, 302, 303 may include a number of sets of processing equipment. The first downstream product transformation stage 300 was described with respect to FIG. 9, and the second and third downstream product transformation stages 302, 304 may operate in a similar or different manner than the stage 300, but would be adjusted to accommodate the different sized particles coming from the second secondary classifier 25 and the third secondary classifier 26.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A system comprising:
    an impact processor configured to mill graphite particles, and comprising an inlet and an outlet;
    a secondary classifier configured to classify graphite particles and comprising an inlet and an outlet, the secondary classifier being downstream of and coupled to the impact processor;
    a recirculation mixer valve downstream of and coupled to the outlet of the secondary classifier; and
    a recirculation line coupling the outlet of the secondary classifier to the inlet of the impact processor,
    wherein the secondary classifier is a first secondary classifier, the recirculation mixer valve is a first recirculation mixer valve, and the recirculation line is a first recirculation line, and wherein the system further comprises:
    a second secondary classifier comprising an inlet and an outlet, the second secondary classifier being downstream of and coupled to the first secondary classifier;
    a second recirculation mixer valve downstream of and coupled to the outlet of the second secondary classifier;
    a second recirculation line coupling the outlet of the second secondary classifier to the inlet of the impact processor:
    a third secondary classifier comprising an inlet and an outlet, the third secondary classifier being downstream of and coupled to the second secondary classifier;
    a third recirculation mixer valve downstream of and coupled to the outlet of the second secondary classifier; and
    a third recirculation line coupling the outlet of the second secondary classifier to the inlet of the impact processor.

2. The system of claim 1, further comprising:
    a dust collector coupled to and downstream of the second secondary classifier.

3. The system of claim 2, wherein the impact processor is an impact classifier processor.

4. The system of claim 2, further comprising:
    a graphite particle source upstream of and coupled to the inlet of the impact processor.

5. The system of claim 2, further comprising:
    a first downstream product transformation stage coupled to the outlet of the first secondary classifier;
    a second downstream product transformation stage coupled to the outlet of the second secondary classifier; and
    a third downstream product transformation stage coupled to the outlet of the third secondary classifier.

6. The system of claim 5, wherein each of the first, second, and third downstream product transformation stages comprises a downstream impact processor, a downstream secondary classifier, and a downstream dust collector.

7. The system of claim 5, wherein each of the first, second, and third downstream product transformation stages comprises a downstream impact processor, at least two downstream secondary classifiers, and a downstream dust collector.

8. The system of claim 5, wherein each of the first, second, and third downstream product transformation stages comprises multiple sets of equipment, each set including a downstream impact processor, a downstream secondary classifier, and a downstream dust collector.

* * * * *